J. L. BURST, Jr., & C. M. d'AUTREY.
PROCESS OF PRESERVING FRUIT.

No. 190,415. Patented May 8, 1877.

WITNESSES:
W. H. Hicks
John Cook

John L. Burst Jr and Charles M. D'Autrey by Alphony Brown atty
INVENTOR.

N. PETERS, PHOTO-LITHOGRAPHER, WASHINGTON, D. C.

UNITED STATES PATENT OFFICE.

JOHN L. BURST, JR., AND CHARLES M. D'AUTREY, OF JACKSONVILLE, FLA.

IMPROVEMENT IN PROCESSES FOR PRESERVING FRUIT.

Specification forming part of Letters Patent No. 190,415, dated May 8, 1877; application filed September 7, 1876.

*To all whom it may concern:*

Be it known that we, JOHN L. BURST, Jr., and CHARLES M. D'AUTREY, of Jacksonville, in the county of Duval, Florida, have invented a new and useful Improvement in Preserving Fruit for Shipping, and that the following is a full, clear, and correct description of our invention, reference being had to the accompanying drawing, making part of this specification, and to the letters of reference marked thereon, in which—

Figure 1:
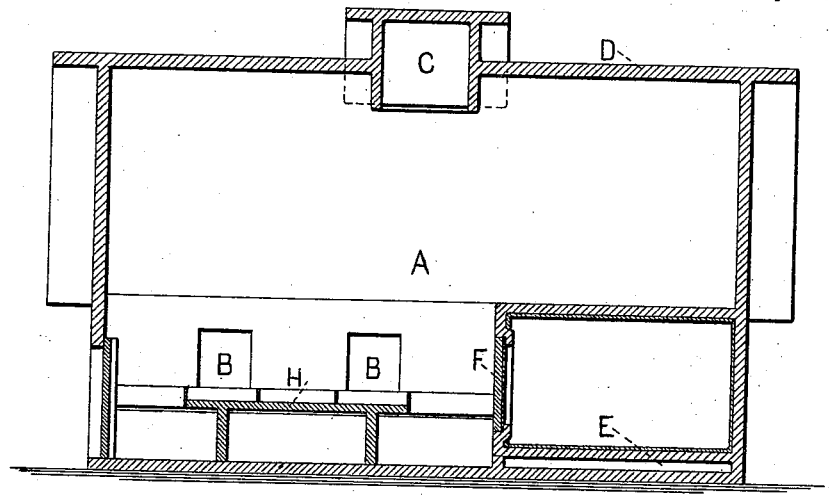
Figure 2:
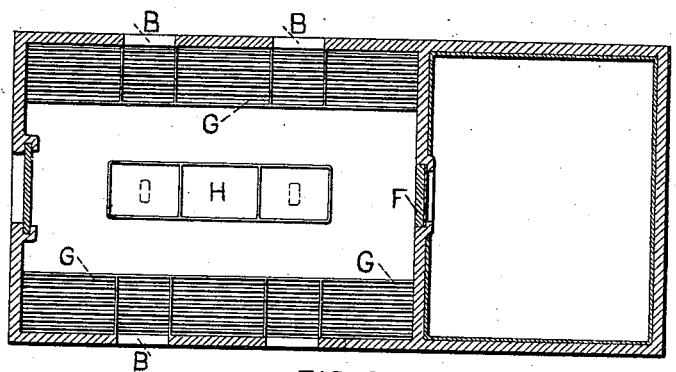
Figure 3:
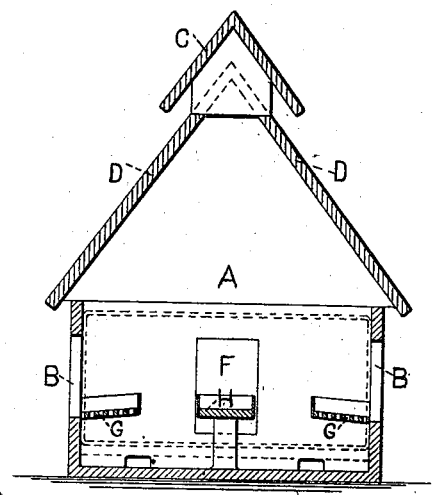

Figure 1 is a longitudinal view of the building used by us in carrying out our process. Fig. 2 is a ground plan of the same. Fig. 3 is a transverse section of the same.

In the drawing like parts of the invention are designated by the same letters of reference.

The nature of our invention consists in improvements in the preservation of fruit for shipping, and is intended to be used more particularly in the preservation of oranges, lemons, and the members of what is known as the citron family, and in the construction of mechanical means for carrying out our invention, the object of the invention being, by its employment, to preserve fruit so that the same may be shipped from its place of growth to distant points and arrive in good salable condition, its flavor being preserved, and the fruit not liable to rot or decay in transit.

To enable those skilled in the arts to make and use our invention we will describe the same, and we would state that we divide our process into two divisions: first, the mechanical, and, second, the chemical, treatment of the fruit to be preserved.

We will now proceed to describe the mechical appliances as made use of to carry out our invention.

This consists of a building, A, made of wood, stone, or any suitable material, provided with windows B upon the sides, and with a ventilator, C, in the roof D. This building is divided upon its interior into a curing-room and a drying-room. The curing-room should be dark, and provided with a double floor, as at E; also lined upon its interior with felt, or some like material, making it air-tight, and provided with a door, F, which shall be hermetically sealed.

The fruit to be treated is cut from the tree, the stem being left as long as possible, and is piled, or introduced into the curing-room, care being taken not to bruise the fruit in this operation. After having been piled into this room the door F is closed, and the fruit is to remain in this portion of the building for about seventy-two hours.

The result reached by this portion of the process, by sweating, is that the acid is extracted from the rind, and the fruit is kept from decaying. The fruit while in the curing-room may be covered with blankets.

After having remained in the curing-room for about seventy-two hours, the door F is unsealed, the fruit uncovered by removing the blankets, and the chemical portion of our process is now availed of.

This consists in sprinkling the fruit with a solution composed of the following ingredients in about the proportions set forth, namely: Water, one quart; Rochelle salts, one-quarter of one ounce; saltpeter, one half of one ounce; lime, (slaked,) one-quarter of an ounce; carbolic acid, one-sixth of an ounce. After the solution applied to the fruit has been absorbed by it, the stems may be cut short, the fruit wiped dry, and placed in the drying-room, which may be provided with a series of racks, G, between the windows B and a central counter, H, upon which racks and counter the fruit may be placed. The fruit is allowed to remain upon the racks G for about twenty-five (25) or thirty (30) hours, or until perfectly dry, and may then be assorted, wrapped in paper, and packed for shipment.

The object of using the chemical solution referred to is to close up the pores of the skin of the fruit, it being applied to the fruit when the pores are open from having been placed in the curing-room, and being, so to speak, at the time of applying the solution in a heated condition, the impurities remaining in the skin or rind are extracted by the solution, and the pores are thoroughly closed, so that the air is excluded from the interior of the fruit.

The fruit thus treated will be kept in good salable condition, and preserve its flavor for a period of at least ninety days, thus greatly enhancing its market value, and preserving a large percentage of fruit that would otherwise be lost by decay.

Having set forth our invention, what we claim as new is—

1. The process herein described for preserving fruit for shipping purposes, consisting of first preparing the fruit by sweating, by which the acid is extracted from the rind, and the pores of the same are opened; then sprinkling the same with a solution of water, Rochelle salts, saltpeter, lime, and carbolic acid, in about the proportions set forth, and finally drying and packing the same, substantially as herein set forth.

2. The curing-room, provided with a double floor, lined with felt or like material, made air-tight, and capable of being hermetically sealed, for the purposes set forth.

3. A solution for the preservation of fruit, composed of water, Rochelle salts, saltpeter, lime, and carbolic acid, in about the proportions set forth.

JOHN L. BURST, JR.
CHARLES M. D'AUTREY.

In presence of—
CHAS. W. BLEW,
JAMES H. BURST.